US008366396B2

(12) United States Patent
Barton et al.

(10) Patent No.: US 8,366,396 B2
(45) Date of Patent: Feb. 5, 2013

(54) UNIT FOR CABLE MANAGEMENT AND WIND TURBINE

(75) Inventors: Werner Barton, Gescher (DE); Johannes Schulz, Nordhorn (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/305,108

(22) Filed: Nov. 28, 2011

(65) Prior Publication Data

US 2012/0133144 A1 May 31, 2012

(51) Int. Cl.
*F03D 11/00* (2006.01)

(52) U.S. Cl. ............................. 416/146 R; 416/DIG. 6

(58) Field of Classification Search .................. 415/232; 416/146 R, DIG. 6; 174/135, 68.1, 68.3, 174/72 A, 99 R; 248/49

See application file for complete search history.

(56) References Cited

U.S. PATENT DOCUMENTS

| 2,015,403 | A | * | 9/1935 | Kiddle et al. | 24/135 R |
| 2,015,404 | A | * | 9/1935 | Kiddle et al. | 24/129 D |
| 2,258,177 | A | * | 10/1941 | Edwards | 384/13 |
| 6,448,494 | B1 | * | 9/2002 | Erlich et al. | 174/46 |
| 2009/0120683 | A1 | * | 5/2009 | Hybiske et al. | 174/480 |

FOREIGN PATENT DOCUMENTS

| WO | WO 2010023160 A2 | * | 3/2010 |
| WO | WO 2010081758 A2 | * | 7/2010 |

* cited by examiner

*Primary Examiner* — Christopher Verdier
*Assistant Examiner* — Aaron R Eastman
(74) *Attorney, Agent, or Firm* — Global Patent Operation; Douglas D. Zhang

(57) ABSTRACT

According to the present disclosure, a cable drip loop securement system that during operation of a wind turbine, including a nacelle supported by a tower prevents knurl formations beyond a specified area of at least one cable that is routed from the nacelle into the tower is provided. The cable drip loop securement system includes a displaceable cable drip loop securement device that accommodates part of the at least one cable and a positioning element for connecting the cable loop securement device inside of the tower. The at least one cable can turn and eventually form knurls only above the cable loop securement device.

15 Claims, 10 Drawing Sheets

| 910 | Adjusting the position of the displaceable cable drip loop securement device along the at least one cable |

↓

| 920 | At least one chosen from affixing part of the at least one cable to the displaceable cable drip loop securement device and providing a stop mechanism that prevents further downward movement beyond the adjusted position of the displaceable cable drip loop securement device |

Fig. 11

UNIT FOR CABLE MANAGEMENT AND WIND TURBINE

BACKGROUND OF THE INVENTION

The subject matter described herein relates generally to methods and systems for wind turbines, and more particularly, to methods and systems concerning the cables inside a wind turbine, even more particularly, the cables routed from the nacelle to the tower.

Energy generated from wind, for example, through the use of large scale wind turbines has experienced rapid growth in recent years. Source of this growth may be the numerous environmental, technical and economic benefits related to wind generated energy production. Wind energy is widely available, renewable and reduces the production of greenhouse gases by diminishing the need of fossil fuels as energy source. Furthermore, improvements in design, manufacturing technologies, materials and power electronic devices of wind turbines has and will in the future continue to decrease production costs of wind turbines while increasing their energy production capabilities and efficiencies.

At least some known wind turbines include a tower and a nacelle mounted on the tower. A rotor is rotatably mounted to the nacelle and is coupled to generator by a shaft. A plurality of blades extend from the rotor. The blades are oriented such that wind passing over the blades turns the rotor and rotates the shaft, thereby driving the generators to generate electricity.

The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

In some known wind turbines, the nacelle of a wind turbine contains many power electronic devices that enable a controlled and efficient conversion of wind energy into electrical energy such as, for example, one or more generators, control and cooling systems. The cables of a wind turbine that feed electrical power into electrical supply grids are often routed from the nacelle to the electrical supply grids via the tower.

To maximize the energy production of a wind turbine, the nacelle is typically able to rotate or pivot versus the fix position of the tower. This allows the rotor blades to be in an optimum position with respect to the wind direction. Hence, thereby the wind turbine is able to exploit a maximum amount of wind energy at all times. Equally, to avoid unfavorable wind gusts or extremely high wind speeds the position of the nacelle may be adjusted accordingly. Based on this movement of the nacelle the cables routed from the nacelle to the tower may be pulled together in a kind of knurl, which is not under control. This twisting and curling behavior of the cables during operation of a wind turbine may lead to several issues such as overheating in the knurls or movement of the knurls to other parts in the tower such as, for example, the ladder or lights.

Further, the movement of the knurl may cause excessive wear of the cables or may damage surrounding structures. In the worst case, such uncontrolled movements of the cable knurls may result in entanglement of the cables inside of the tower that may eventually lead to system failure.

For this purpose, it will be appreciated that controlling the cable knurls is desired. Hence, the subject matter described herein pertains to methods and systems that enable the aforementioned control of cable knurls especially, but not limited to the cable knurls formed inside of a wind turbine tower during its operation.

BRIEF DESCRIPTION OF THE INVENTION

In one aspect, a cable drip loop securement system for use in a wind turbine, the wind turbine including: a nacelle supported by a tower and at least one cable that is routed from the nacelle to the tower and the cable drip loop securement system including a displaceable cable drip loop securement device for accommodating part of the at least one cable and a positioning element for connecting the displaceable cable drip loop securement device to the tower is provided. The cable drip loop securement system is adapted to prevent the formation of knurls by the at least one cable below the displaceable cable drip loop securement device.

In another aspect, a wind turbine including: a nacelle supported by a tower, at least one rotor blade to capture wind energy, at least one cable routed from the nacelle to the tower and a cable drip loop securement system that includes a displaceable cable drip loop securement device for accommodating part of the at least one cable and a positioning element for connecting the displaceable cable drip loop securement device to the tower is provided. The cable drip loop securement system is adapted to allow the formation of knurls by the at least one cable only above the displaceable cable drip loop securement device.

In yet another aspect, a method for controlling the formation of cable knurls in a wind turbine, the wind turbine including: a nacelle supported by a tower, at least one cable routed from the nacelle to the tower, and a cable drip loop securement system including a displaceable cable drip loop securement device and a positioning element is provided. The method includes adjusting the position of the displaceable cable drip loop securement device along the at least one cable and at least one chosen from: affixing part of the at least one cable to the displaceable cable drip loop securement device and providing a stop mechanism that prevents further downward movement beyond the adjusted position of the displaceable cable drip loop securement device.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein:

FIG. 11 is a block-diagram according to embodiments herein showing a method for controlling the cable knurls inside of a wind turbine tower.

DETAILED DESCRIPTION OF THE INVENTION

Figure 1:
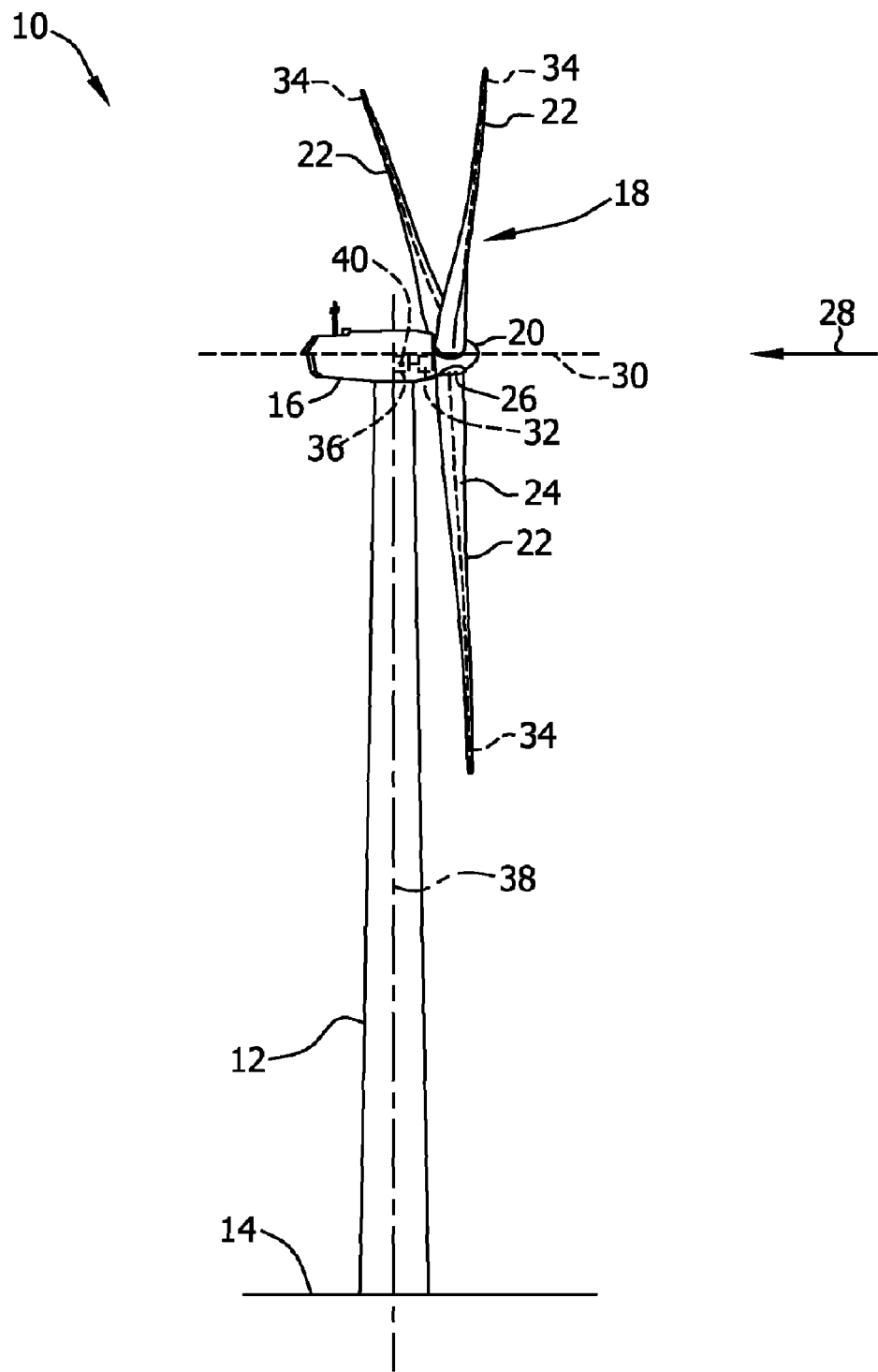
FIG. 1 is a perspective view of an exemplary wind turbine.

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

As used herein, the term "cable" is intended to be representative of any type of cable such as, for example, single- double- or triple-core power cables, radial field or collectively shielded power cables or any other conductive or non-conductive cables or cords that are routed from the nacelle to the tower of a wind turbine, for example, control cables.

As used herein, the term "knurl" is intended to be representative of the aggregation of at least one cable, for example, in the form of a cable knot that results from twist strain or writhe of at least one cable. Twisting forces of the nacelle may cause the at least one cable, generally routed from the nacelle to the tower of a wind turbine, to coil-up or super-coil and thus get pulled together, hence, usually shortening the relative length and broadening the relative width of the at least one cable. Generally, one twist is equivalent to one complete rotation of the cable around its longitudinal axis, hence one 360 degree rotation.

As used herein, the term "cable drip loop securement system" is intended to be representative of at least one displaceable cable drip loop securement device, which in particular enables controlling or avoiding the formation of cable knurls, typically, inside of a wind turbine tower.

As used herein, the term "fixing element" is intended to be representative of a fastening mechanism or one or more devices such as, for instance, straps, binders or clamps that are used to immobilize a part of at least one cable to the aforementioned cable drip loop securement device.

As used herein the term "positioning element" is intended to be representative of a mechanism or one or more devices that enable attaching the at least one displaceable cable drip loop securement device to a wind turbine, usually to the inside of a wind turbine and possibly to the inside wall of a wind turbine tower. The position of the positioning element with respect to the wind turbine may be changed.

As used herein, the term "multi-roller system" is intended to be representative of one or more structural components such as, for instance and not limited to bearings, single- or double-row ball bearings or any other type of roller system that enables movement between two objects with a minimized amount of friction.

As used herein, the term "supervision system" is intended to be representative of any system (e.g., including a twist switch) that is capable of detecting malfunctions in a system, generally, due to jammed or twisted components. In the case of a system malfunction, the supervision system is usually further able to initiate a stop sequence that, for example, brings the operation of a wind turbine to a halt. Furthermore, a supervision system may be designed to include a limit pull cord switch, which may, for example, monitor the cable length or cable reserve (e.g., in a cable reservoir), above or below the at least one displaceable cable drip loop securement device.

As used herein, the term "untwisting element" is intended to be representative of a passively or actively driven mechanism or one or more devices such as, for instance, a weight that facilitates the complete untwisting of at least one cable or cable bundle during the backward rotational movement of a wind turbine nacelle.

As used herein, the term "stop mechanism" is intended to represent aids such as, for example, cross-bars or adjustable bars that limit the range of motion of the displaceable cable drip loop securement device.

Processors described herein process information transmitted from a plurality of electrical and electronic devices that may include, without limitation, sensors, actuators, compressors, control systems, twist switches, and/or monitoring devices. Such processors may be physically located in, for example, a control or supervision system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

In the exemplary embodiments, a real-time controller that includes any suitable processor-based or microprocessor-based system, such as a computer system, that includes microcontrollers, reduced instruction set circuits (RISC), application-specific integrated circuits (ASICs), logic circuits, and/or any other circuit or processor that is capable of executing the functions by, for example the supervision system as described herein. In one embodiment, the controller may be a microprocessor that includes read-only memory (ROM) and/or random access memory (RAM), such as, for example, a 32 bit microcomputer with 2 Mbit ROM, and 64 Kbit RAM. As used herein, the term "real-time" refers to outcomes occurring in a substantially short period of time after a change in the inputs affect the outcome, with the time period being a design parameter that may be selected based on the importance of the outcome and/or the capability of the system processing the inputs to generate the outcome.

The embodiments described herein include a wind turbine system that enables controlling the cable knurls that may form below the nacelle, inside of the tower during operation of an on- or offshore wind turbine with energy production capacities of between 1 and 6 MW, and more. More specifically, controlling the cable knurls inside of the tower prevents several issues such as overheating in the cable knurls, movement and entanglement of the knurls to and with other parts inside of the tower such as, for example, the ladder or lights. Further, by controlling the knurls formed inside of the tower during the pivoting movement of the nacelle with respect to the fixed tower position, unnecessary wear on the cables may be reduced. This may safe replacement costs of damaged cables that may otherwise arise in wind turbines where the cables are not controlled in a manner as described herein.

In addition, controlling the cable knurls inside of a wind turbine tower may further increase the reliability and service life of wind turbines by minimizing the risk of system failure due to entanglement of the cables. Such system failures may require interrupting the operation of a wind turbine for de-entanglement or repairs associated with uncontrolled cable knurls. Further, controlling cable knurls often also increases safety with respect to service personnel that may need to access the nacelle or tower during operation of a wind turbine.

In some embodiments herein, a cable drip loop securement system is installed in a wind turbine that enables controlling the formation of cable knurls inside of the wind turbine tower. Usually, the cables (e.g. power cables including control cables) routed from the nacelle to the tower of a wind turbine are prone to forming knurls during the operation of a wind turbine in particular when the nacelle is rotated by, for example, a yaw bearing with respect to the fixed tower.

Typically, the cable drip loop securement system is composed of at least two components: a displaceable cable drip loop securement device, which usually allows at least one cable to be passed through or along it and a positioning element, which connects the displaceable cable drip loop securement device to a wind turbine, usually to the inside of the wind turbine tower. Further, the displaceable cable drip loop securement device is positioned inside of the wind turbine tower, for example, 5 m to 15 m from the nacelle. In general, it is possible to change the position of the positioning element with respect to the wind turbine. Furthermore, and not limited to a particular embodiment at least two cables may be passed through or along the displaceable cable drip loop securement device.

Generally, during operation of a wind turbine the at least one cable routed from nacelle to tower may only turn above the displaceable cable drip loop securement device. However, in the case that the at least one cable below the displaceable cable drip loop securement device is twisted and forms knurls, these knurls would be controlled to remain below the displaceable cable drip loop securement device. In either case, any twisting or knurl formations of the part of at least one cable above the displaceable cable drip loop securement device may be prevented from being transmitted to the part of the at least one cable below the displaceable cable drip loop securement device and vice versa. Hence, the rotational movement of the part of at least one cable above the displaceable cable drip loop securement device may be isolated from the rotational movement, if any, of the part of the at least one cable below the displaceable cable drip loop securement device and vice versa.

According to embodiments, the displaceable cable drip loop securement device may be a specially designed disc. The disc is typically made of very light and strong materials such as, for example metals or metal alloys. It has a diameter that may range from 10 cm to 100 cm and a thickness of generally 0.5 cm to 20 cm. The disc may have a hollow space, for example, a hole in its centre that may facilitate disc production, increase air cooling efficiency of the at least one cable, thereby allowing for reduced cable diameters and finally it may provide attachment points for fixing elements such as cable straps or clamps that may secure a portion of the at least one cable. Further, the disc may include at least one through-hole that connects the top circular surface with the bottom circular surface of the disc, and hence, may enable at least one cable to pass through the disc. The at least one through-hole may be located anywhere on the circular surface of the disc. Generally, the diameter of the at least one through-hole ranges from 1 cm to 10 cm in order to accommodate at least one cable or cable bundle of two or more individual cables.

The number and size of through-holes in the disc may be limited by the size of the disc and the need of the disc to retain its functional integrity. Hence, one, two, three, four or more through-holes, of the same or different diameters and shapes (e.g. circular, oval, square, trapezoidal etc.) may be available sym- or asymmetrically positioned around the disc, whilst ensuring that the integrity and robustness of the disc remains within functional limits.

The through-holes may be fitted in size so as to fix the at least one cable in position. Further, the through-holes may include fixing elements such as straps, clamps or snap rings that fix the at least one cable in position and stop it from moving or twisting during operation of the wind turbine. Furthermore, the through-holes are generally in a parallel position with respect to the longitudinal axis of the disc, however, in embodiments herein the through-holes may be at an angle with respect to the longitudinal axis of the disc, which allows, for instance, spacing apart the at least one cable when entering at one side and grouping together the at least one cable when exiting on another side of the disc.

The disc may have at least one, usually two or more protrusions in the form of a rail. The rail may have a triangular, square, rectangular, rounded or any other type of shape that fits into the corresponding at least one, usually two or more guide rails of a guiding rail system. A guiding rail system may typically be installed inside of the tower of a wind turbine and may have a length from 2 m to 20 m, preferably from 5 m to 15 m or may extend up to 20 m downward from the nacelle. In general, the displaceable cable drip loop securement device does not rotate in the horizontal plane around its vertical axis. Typically, in the embodiments described herein, the guiding rails system may be representative of a positioning element.

Not limited to one particular embodiment herein, to ensure that the disc does not get jammed against the guide rail system, the disc may be shaped with a certain length, particularly from 5 cm to 400 cm. Further, at least one multi-roller system may be positioned at the contact areas of the disc with the guide rail system. Typically, more than one multi-roller system may be employed between a rail of the specialized disc and a guide rail of the guide rail system.

The multi-roller system further enables the displaceable cable drip loop securement device to move in a vertical direction, up or down the guide rail system. Hence, the space available between the exit of the at least one cable from a nacelle base plate and the entry into the displaceable cable drip loop securement device may be adjusted to accommodate for an unhindered and non-damaging degree of twisting and knurl formation of the at least one cable above the displaceable cable drip loop securement device.

The fixing elements may also be loosened or opened to enable the displaceable cable drip loop securement device to change position along the at least one cable. Once a desired cable length part above the displaceable cable drip loop securement device is obtained, the at least one cable may again be fixed to the displaceable cable drip loop securement device by closing or fastening the fixing elements. This ensures that the at least one cable part involved in knurl formation, typically above the displaceable drip loop securement device is large enough to minimize the dimensions of the knurls, the heat formation in the knurls and the strain and wear during twisting of the at least one cable during operation of a wind turbine.

In further embodiments herein, the specialized disc with the at least one, usually two or more protrusions in the form of a rail and the at least on multi-roller system per protrusion may be positioned inside a pipe with at least one, normally two or more internal guide rails made of a light composite or metallic material that may extend the full or only a part of the full length of the pipe. Typically, in the embodiments described herein, the pipe may be representative of a positioning element. The pipe may be positioned to surround or enclose the at least one cable exiting the nacelle through the base plate of a wind turbine and may be as long as required to accommodate enough space for adjusting the displaceable cable drip loop securement device and allowing the knurl formation of the at least one cable during the operation of a wind turbine. Typically, the pipe's dimensions are: inner diameter from 10 cm to 100 cm, outer diameter from 11 cm to 110 cm and length from 5 cm to 250 cm and more.

Not limited to one particular embodiment described herein, a stop mechanism such as, for example, a cross-bar may be positioned inside the pipe to limit the range of motion of the displaceable cable drip loop securement device. Once installed, the stop mechanism usually prevents a further downward movement of the displaceable cable drip loop securement.

Generally, the pipe may be connected to the wind turbine tower by at least one fixing bar or two fixing bars positioned on opposing sides of the circumferential area of the pipe. Typically, two or more fixing bars may be used in a triangular or rectangular arrangement around the circumferential area of the pipe. More fixing bars, such as for example between six and nine or more, may be employed along the pipe depending on its length.

According to embodiments, the displaceable cable drip loop securement device may be a plate system with at least one plate. This plate system may be connected to a wind turbine tower via a positioning element, which typically includes adjustable bars. The adjustable bars may, for example, include pin joints, which enable the plate system to change position in the vertical direction of a wind turbine tower with respect to the positioning element that is mounted to, for instance, the inside of the tower. Further, the adjusting bars may adjust the position of the plate system in the horizontal plane, perpendicular to the vertical axis of a wind turbine tower such that an interaction of the routed cables with obstacles inside of the tower such as, for example, lights may be avoided. Furthermore, the adjusting bars may be adapted to act as a stop mechanism that may be adjusted to define the range of motion of the at least one plate.

The plate system may include at least on plate, which in a vertical position has dimensions of length from 5 m to 10 m, of width from 10 cm to 100 cm and of thickness from 0.5 cm to 10 cm. In the case that more than one plate is used the different plates may be interconnected via side bars. The adjustable bar may be connected to either one or all of the plates.

The at least one cable may be affixed to either side of the at least one plate by fixing elements. One or more cables or cable bundles may be fixed separately or in bundles to either side of the at least one plate. Fixing the one or more cables or cable bundles allows for the cable parts above the plate system to twist and form knurls during operation of a wind turbine without transmitting the twisting forces to the cable parts below the plate system or vice versa. Similarly in embodiments described herein, the at least one plate may be adapted to provide leeway or wiggle room for the at least one cable without affixation.

Not limited to a particular embodiment, a supervision system may be included with the displaceable cable drip loop securement system. Such a supervision system enables monitoring the twisting or untwisting of at least one cable and, for instance, in the case of a cable jam may stop the pivoting of the nacelle on the tower of a wind turbine or may shut down the operation of the wind turbine completely. During operation of the wind turbine, the supervision system may also initiate a backward movement of the nacelle that unwinds or relaxes the coiled-up or super-coiled at least one cable routed from the nacelle to the tower without shutting down the wind turbine. According to embodiments described herein, typically, the nacelle of a wind turbine may rotate with respect to the tower in the same direction for 1.5 to 2.5 complete rotations before unwinding. The supervision system may be a twist switch, which is, in general, with one part positioned on the nacelle cable fixing and with the other part on the displaceable cable drip loop securement device. Further, the supervision system may include a limit pull cord switch, which may, for example, monitor the cable length or cable reserve, above or below the at least one displaceable cable drip loop securement device and may also initiate unwinding of the wind turbine nacelle.

In embodiments herein, the displaceable cable drip loop securement device may include an untwisting element, which supports the unwinding or untwisting of the at least one cable or cable bundle during the backward movement of a wind turbine nacelle. For example, a passively driven weight may be connected or attached to the bottom of the displaceable cable drip loop securement device, which exerts a downward force on the displaceable cable drip loop securement device that may help to untwist the at least one cable or cable bundle. The weight is typically heavy enough to enable and support a complete untwisting of the at least one cable or cable bundle without causing them any tensile damage. Usually, the weight weighs from 30 kg to 720 kg and more often from 120 kg to 350 kg.

The use of an actively driven untwisting mechanism may also be employed in embodiments described herein, for instance, the displaceable cable drip loop securement device may be driven by an electric motor, which may control and monitor the position of the displaceable cable drip loop securement device. In general, the electric motor may re-position the displaceable cable drip loop securement device during twisting or untwisting of the at least one cable. Hence, the electric motor may also function as stop mechanism in embodiments herein. Further, the electric motor may be powered directly by the generator of the wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height.

Rotor blades 22 are spaced about hub 20 to facilitate rotating rotor 18 to enable kinetic energy to be transferred from the wind into usable mechanical energy, and subsequently, electrical energy. Rotor blades 22 are mated to hub 20 by coupling a blade root portion 24 to hub 20 at a plurality of load transfer regions 26. Load transfer regions 26 have a hub load transfer region and a blade load transfer region (both not shown in FIG. 1). Loads induced to rotor blades 22 are transferred to hub 20 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control or supervision system can also include memory, input channels, and/or output channels.

Figure 2:
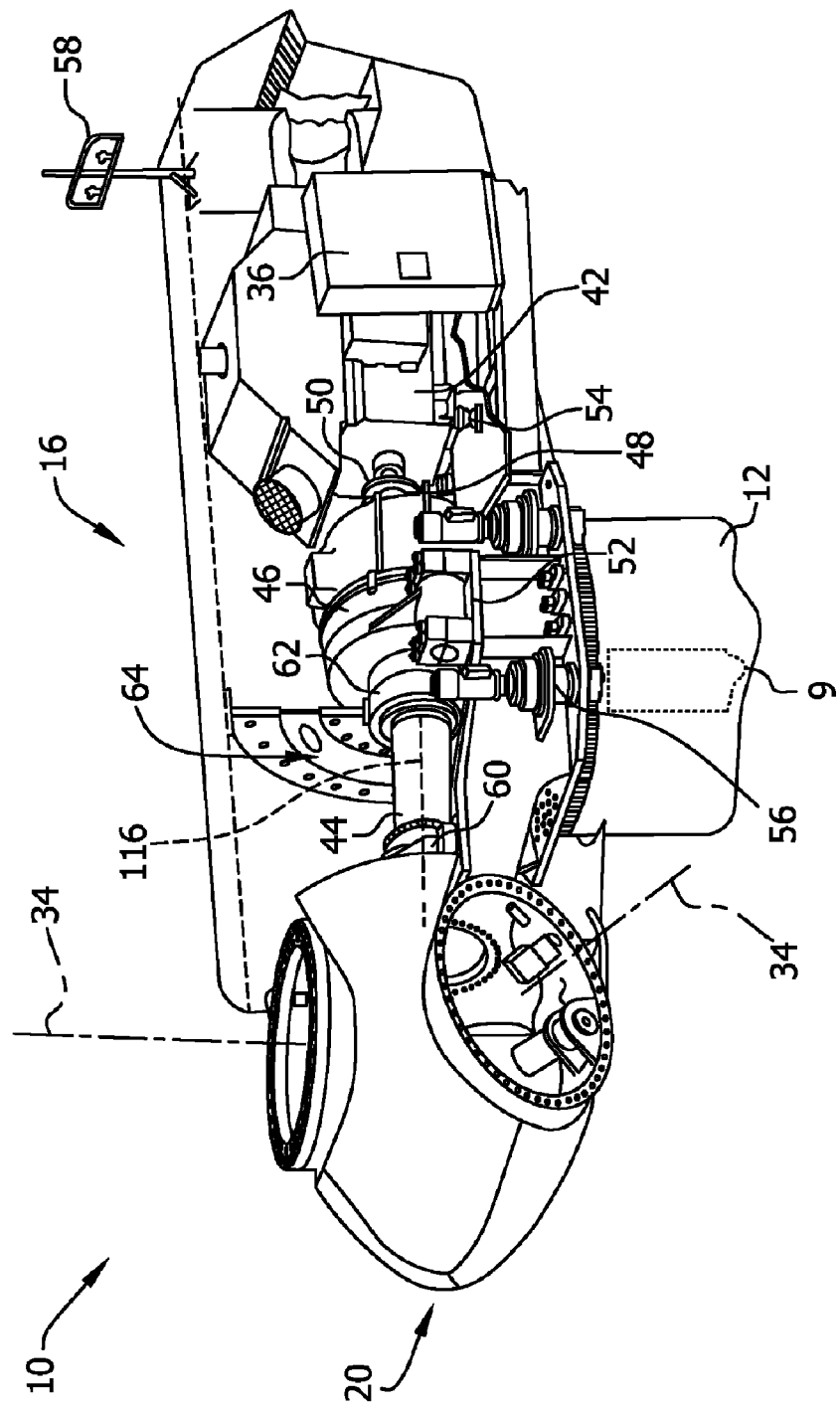
FIG. 2 is an enlarged sectional view of a portion of the wind turbine shown in FIG. 1 indicating the position of a cable drip loop securement system according to embodiments herein.

FIG. 2 is an enlarged sectional view of a portion of wind turbine 10 including cable drip loop securement system 9. In the exemplary embodiment, wind turbine 10 further includes nacelle 16 and hub 20 that is rotatably coupled to nacelle 16. More specifically, hub 20 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 20 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

Figure 3:
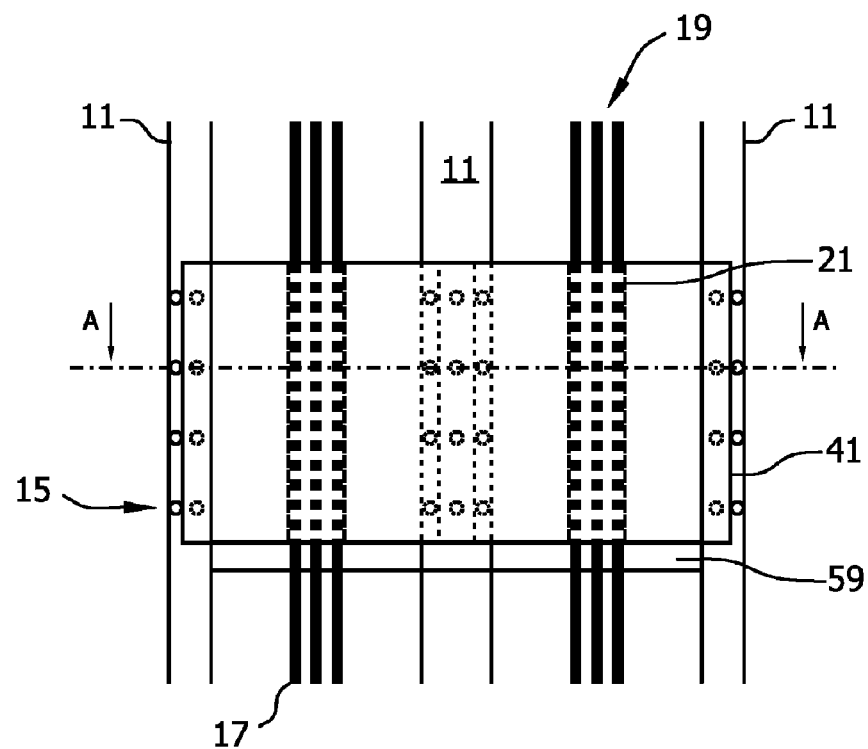
FIG. 3 is schematic view according to embodiments herein of a portion of a wind turbine tower showing a cable drip loop securement system.

According to embodiments herein, FIG. 3 shows a portion of a wind turbine, for instance, of wind turbine 10 as shown in FIG. 1 with a displaceable cable drip loop securement device in form of disc 41 movably connected to three guide rails 11. Individual cables 17 or groups of cables 19, routed from the nacelle are directed into through-holes 21 of disc 41 in a vertical direction. In this particular embodiment, four multi-roller systems 15 connect disc 41 and guide rail 11. However, the number of multi-roller systems 15 per rail 11 may change depending on, for example, the longitudinal length of disc 41. Multi-roller systems 15 enable disc 41 to move up or down along guide rails 11, usually depending on the degree of cable twisting, which is proportional to the degree of movement or rotation of the nacelle.

FIG. 3 further shows a stop mechanism 59 that may limit the range of motion of disc 41 in embodiments where the at least one cable 17 is not affixed to disc 41. In particular the stop mechanism may prevent a downward movement beyond a predetermined position of the displaceable cable drip loop securement device. A stop mechanism may be employed in any of the embodiments described herein even if not explicitly shown in the figures.

Figure 4:
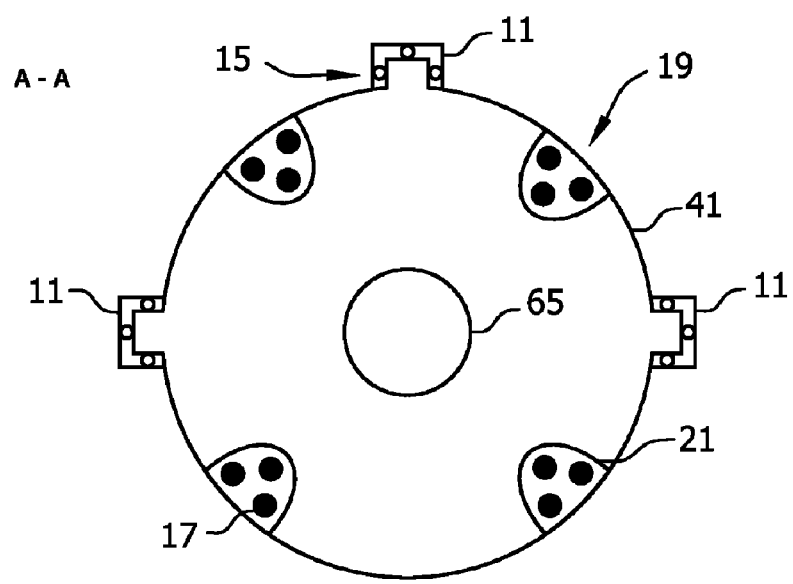
FIG. 4 is a schematic cross-sectional view (A-A) of a portion of the wind turbine tower with the cable drip loop securement system as shown in FIG. 3 according to embodiments herein.

FIG. 4 shows cross-section A-A from a portion of wind turbine in FIG. 3 according to embodiments herein. The through-holes 21 are located on the circumferential edge of disc 41 and show twelve individual cables 17 in groups of three cables 17 per through-hole 21. The number of individual cables 17 may vary as well as the number of through-holes 21. Further, the position and size of through-holes 21 may also vary, for example, through-holes 21 may be positioned towards the center of disc 41. FIG. 4 also shows multi-roller systems 15 that enable disc 41 to move along guide rails 11 during twisting of at least one cable 17. Disc 41 shows a hollow space 65 that may provide more efficient cooling, especially, air cooling to the at least one cable 17. Further, hollow space 65 may facilitate the production of disc 41 and enables an easy attachment for clamps or cable straps that fixate a portion of the at least one cable 17.

Figure 5:
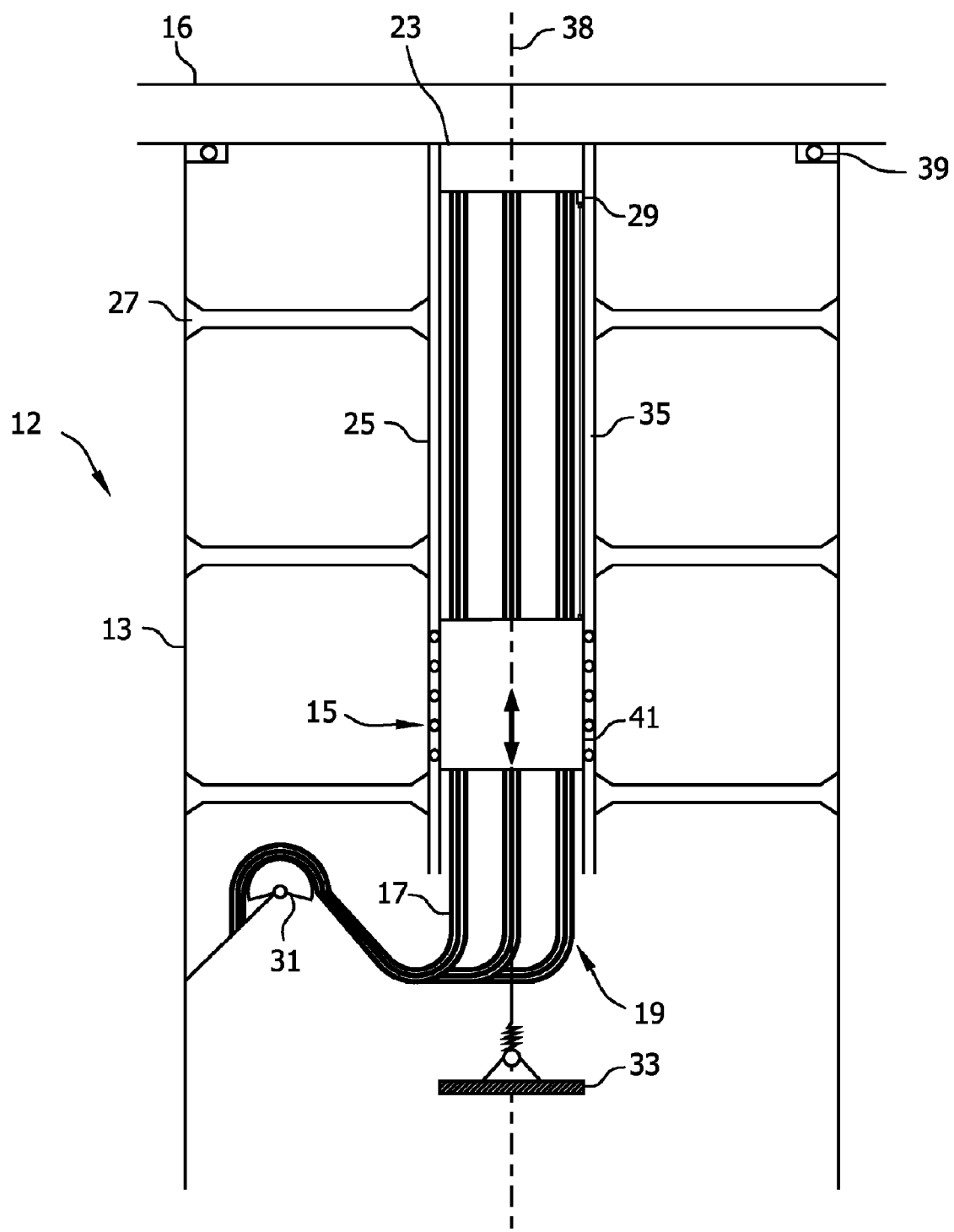
FIG. 5 is a schematic view according to embodiments herein of a portion of a wind turbine tower showing a cable drip loop securement system inside of a pipe.
Figure 6:
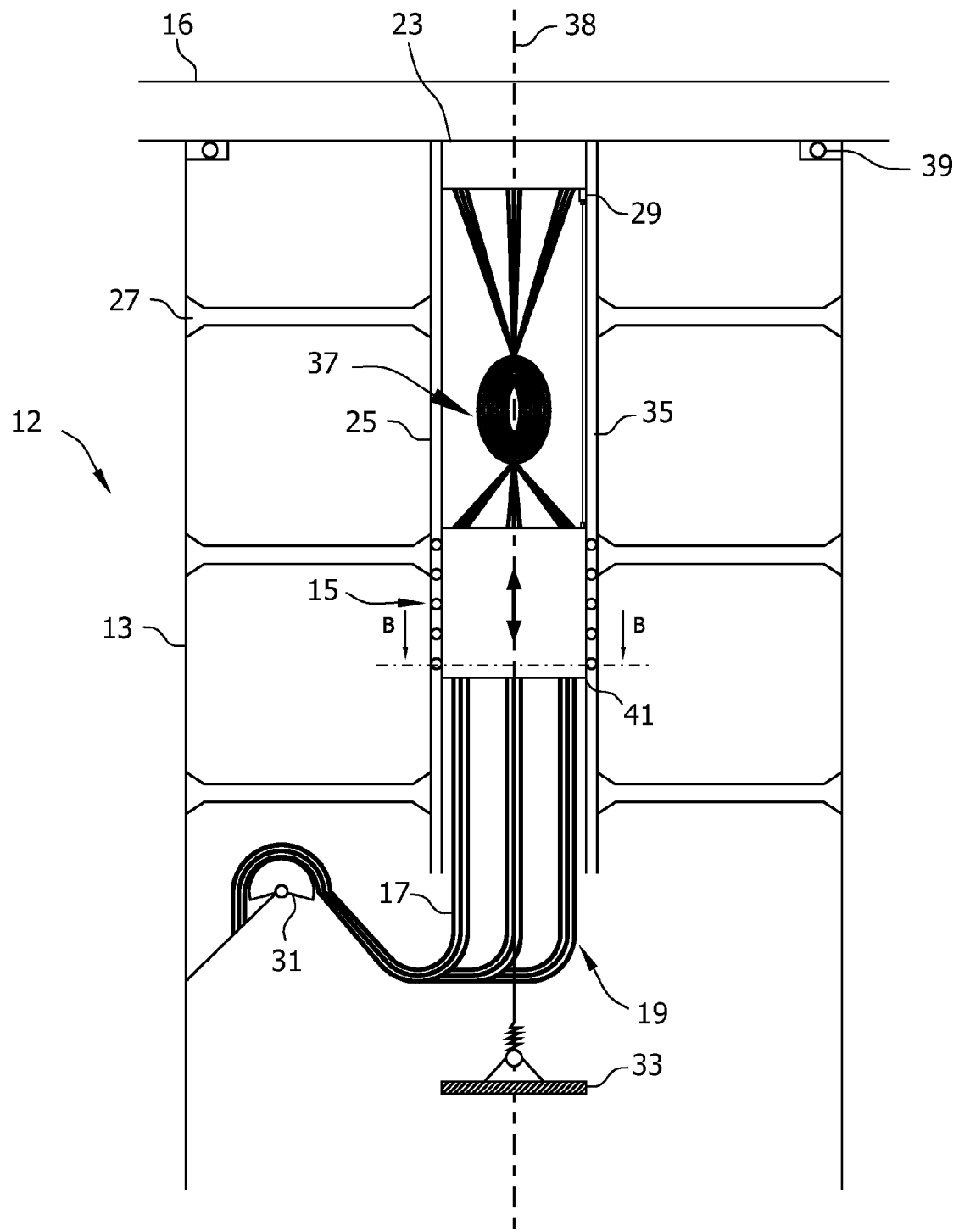
FIG. 6 is a schematic view according to embodiments herein of the cable drip loop securement system shown in FIG. 5 including a cable knurl.
Figure 7:
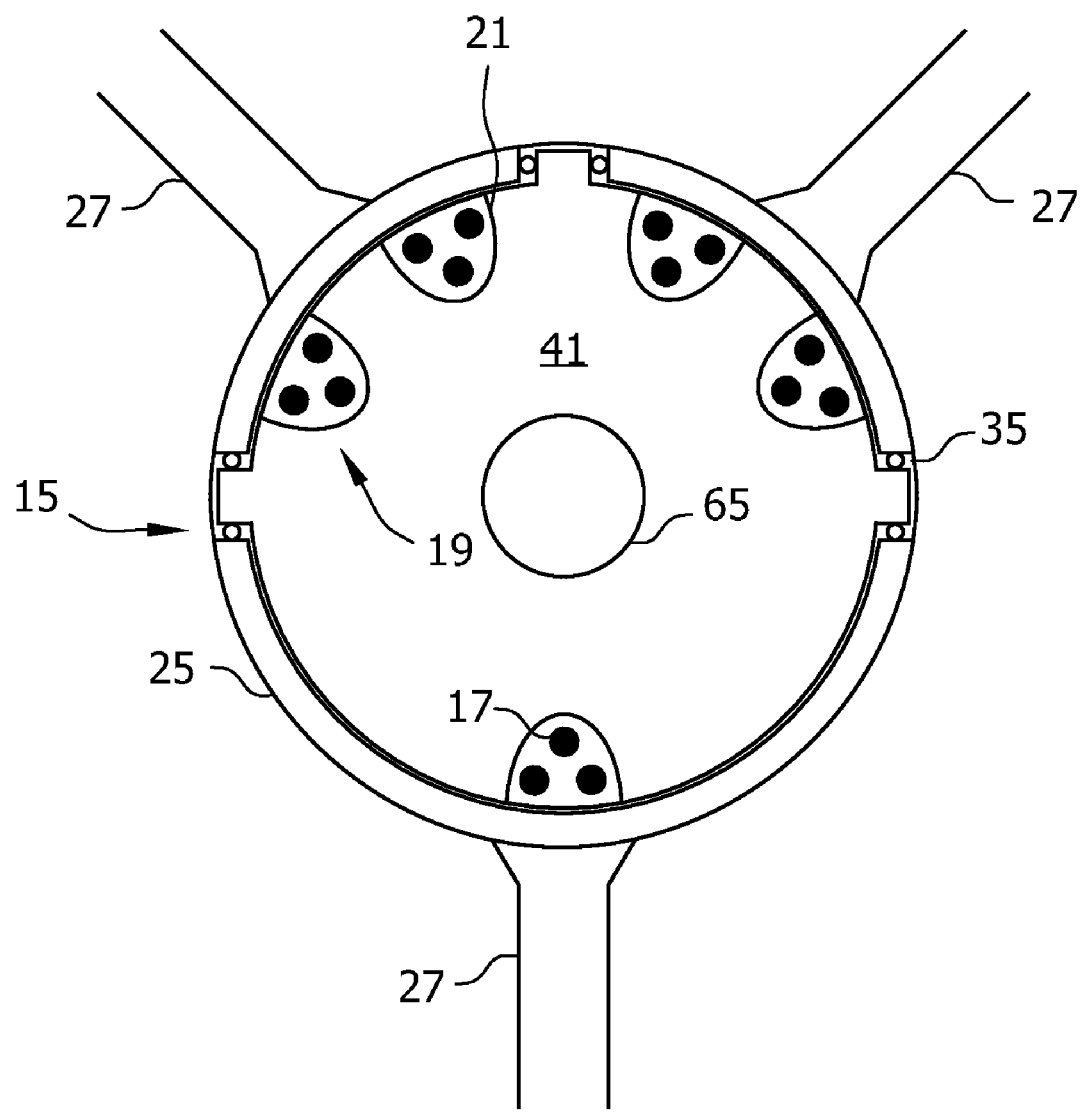
FIG. 7 is a cross-sectional view (B-B) of a portion of the wind turbine with the cable drip loop securement system inside of a pipe as shown in FIG. 6 according to embodiments herein.

FIGS. 5, 6 and 7 show displaceable cable drip loop securement device in form of disc 41 inside a pipe 25 according to embodiments described herein. FIG. 5 shows an upper section of tower 12 and lower section of nacelle 16. A base plate (not shown in the Figs.) may be located between tower 12 and nacelle 16. Further, yaw bearing 39 is generally located between tower 12 and nacelle 16, which enables the nacelle to rotate on fixed tower 12. In general, the cable drip loop securement system may be positioned adjacent to the nacelle in the tower of a wind turbine.

FIG. 5 further shows at least one cable 17 or groups of cables 19 routed from nacelle 16 through nacelle cable fixing 23 into pipe 25 of tower 12. The at least one cable 17 or cable bundle 19 are passed through disc 41 parallel to yaw axis 38 and further down the tower via guiding element 31. Pipe 25 may be connected to nacelle 16 on its bottom plate (not shown in the Figs.) such that it encloses nacelle cable fixing 23. Fixing bars 27 attached to the inside of tower wall 13 may hold pipe 25 in position and provide stability to the displaceable cable drip loop securement system. A plurality of fixing bars may be used surrounding the disc according to embodiments herein.

The three or more internal guide rails 35 provide guidance for disc 41 inside of pipe 25. Not limited to a particular embodiment the positioning element may prevent a rotational movement of the displaceable cable drip loop securement device. A plurality of multi-roller systems 15 are positioned between disc 41 and pipe 25 to facilitate smooth and easy up or down movement of disc 41.

Disc 41 may be moved up or down pipe 25 before fixing at least one cable 17 or groups of cables 19 inside the through-holes of disc 41. This enables the available space between nacelle cable fixing 23 and disc 41, inside of pipe 25 to be adjusted.

As shown in FIG. 6, during operation of the wind turbine and rotation of nacelle 16, the at least one cable 17 may twist to form knurl 37 inside of pipe 25 in the region above disc 41 and below nacelle cable fixing 23. During knurl formation disc 41 may be displaced upward, inside of pipe 25. This upward movement may be minimal in embodiments where the at least one cable is not fixed to disc 41. During a backward movement or rotation of nacelle 16, enabled by yaw bearing 39, the at least one cable 17 unwinds or untwists causing disc 41 to move downward inside of pipe 25.

To facilitate and possibly enhance the efficiency of the at least one cable 17 or cable bundle 19 unwinding during the backward movement of nacelle 16, an untwisting mechanism including an untwisting element (not shown in the Figs.) which, for example, may be a weight that is attached to the bottom of disc 41. During a backward movement of nacelle 16, the untwisting element then exerts a downward force on disc 41, which assists untwisting the at least one cable 17. Even though not illustrated in all the Figs., the untwisting mechanism may also be part of the other embodiments described herein, especially, with respect to the plate system described in more details below.

Further, FIGS. 5 and 6 show a supervision system 29 that is connected to both, nacelle cable fixing 23 and disc 41. Supervision system 29 continuously monitors twisting and untwisting of the at least one cable 17 in real time and in the case of a cable jam may autonomously stop nacelle 16 from rotating or may initiate a stop sequence of the wind turbine via a wind turbine processor and control system to prevent damages to any mechanical parts of the wind turbine. Further, supervision system 29 may initiate an autonomous backward movement of nacelle 16 once a maximum number of nacelle 16 rotations in the same direction have been detected. The maximum number of nacelle 16 rotations may be predefined to prevent any damage to the system.

According to embodiments described herein and not limited to one particular embodiment, FIGS. 5 and 6 show an additional supervision system 33. Supervision system 33 continuously monitors the at least one cable 17 or cable bundle 19, usually, from the guiding element (e.g., a cable saddle) to the lower part of disc 41. Supervision system 33 may be a limit pull cord switch that monitors the reserve of the at least one cable 17. When the reserve of the at least one cable 17 below disc 41 is exhausted the limit pull cord switch may, for example, initiate an unwinding of nacelle 16.

According to embodiments described herein, FIG. 7 shows cross-section (B-B) of FIG. 6 with disc 41 and pipe 25 including three fixing bars 27. Fixing bars 27 are distributed evenly around pipe 25. However, the number of fixing bars surrounding the pipe may be less or more and their distribution around the pipe may vary. Further, five through-holes 21 are shown asymmetrically distributed at the circumferential edge of disc 41. Generally, and not limited to a particular embodiment described herein, through-holes may also be positioned away from the circumferential edge of a disc and may go through the disc at an angle and not parallel to the longitudinal axis of the disc.

When cable knurl 37 forms inside of pipe 25 due to the twisting of at least one cable 17 above disc 41, multi-roller system 15 enables a smooth, easy and controlled displacement of disc 41 along internal guide rails 35. Pipe 25 prevents any cable knurls from interacting with other parts of the tower, hence, reducing the chance of cable jams and wind turbine malfunctions. Further, disc 41 may also contain a hollow space 65 for cooling purposes, production needs or facilitated access for attachment of cable clamps, straps or binders.

Figure 8:
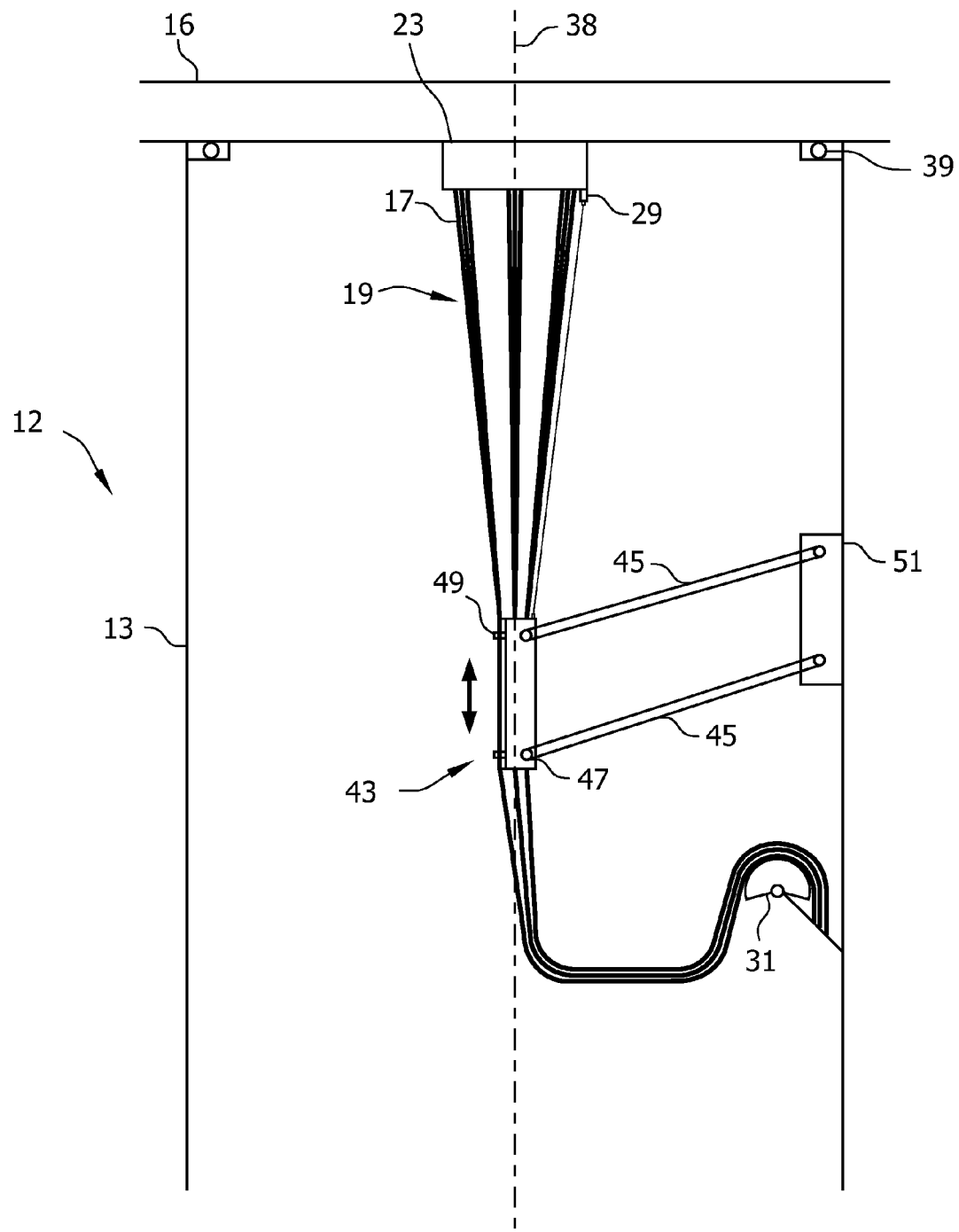
FIG. 8 is a schematic view according to embodiments herein of a portion of a wind turbine tower showing a cable drip loop securement system that includes a plate system.
Figure 9:
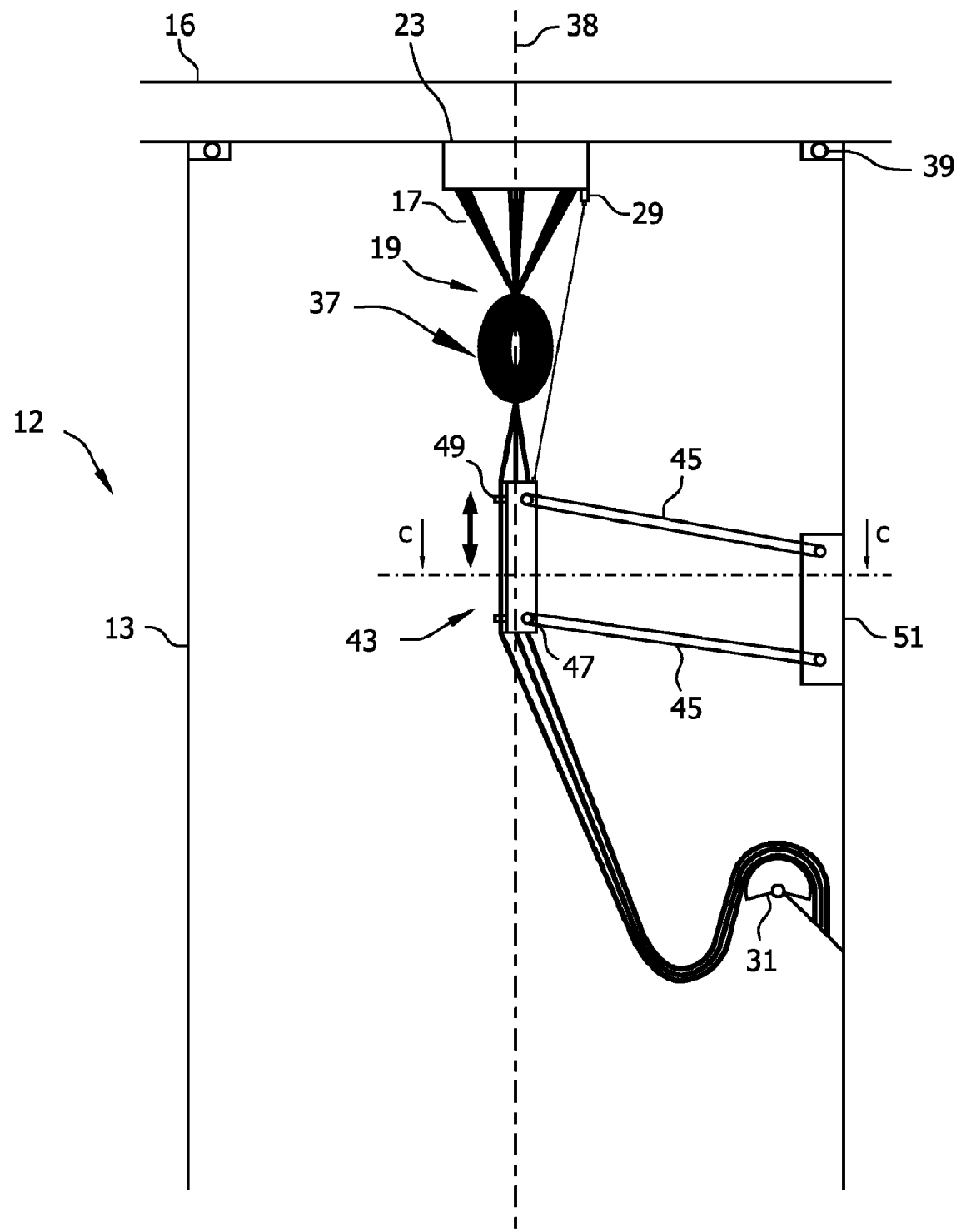
FIG. 9 is a schematic view according to embodiments herein of the cable drip loop securement system shown in FIG. 8 including a cable knurl.
Figure 10:
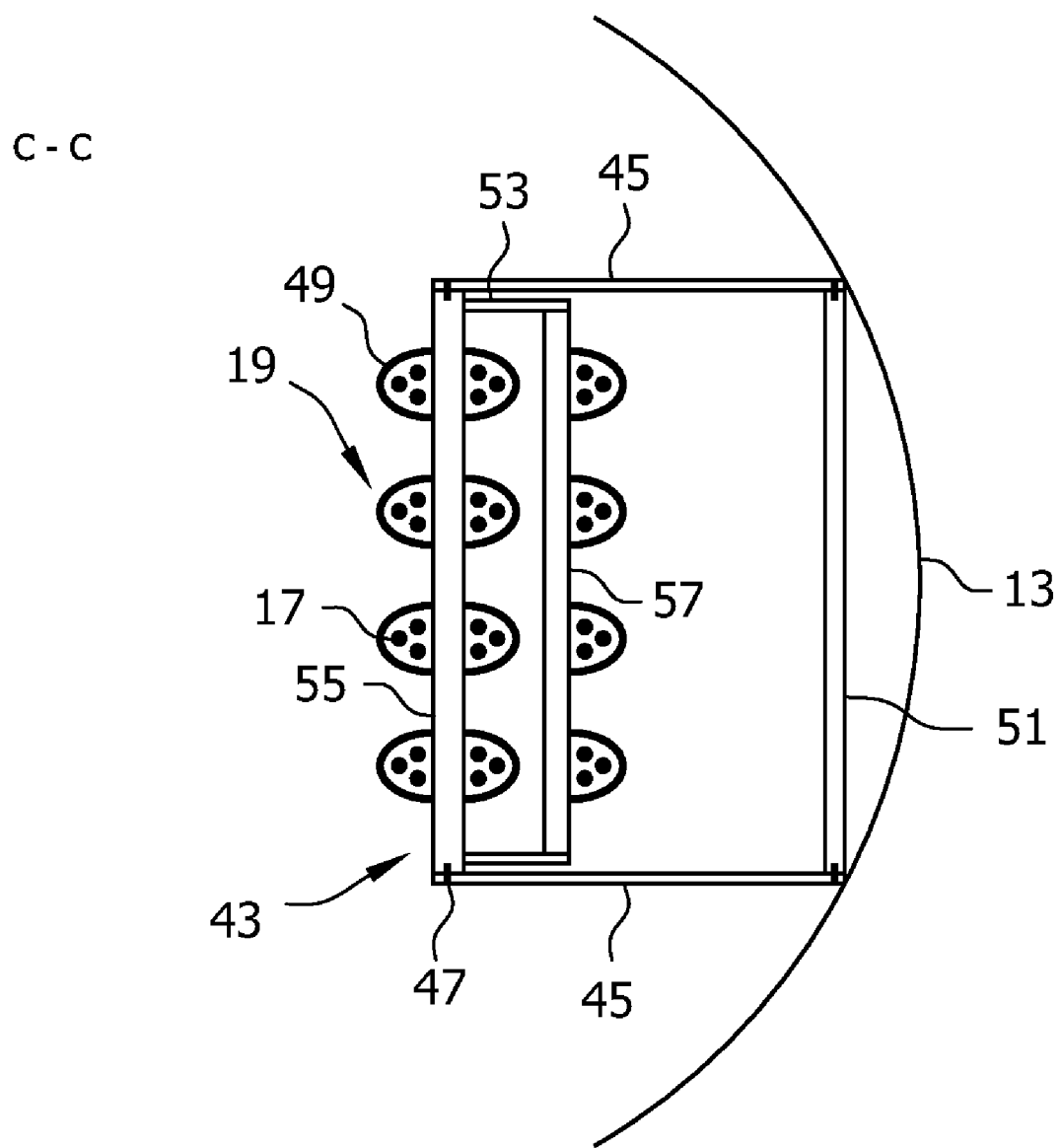
FIG. 10 is a cross-sectional view (C-C) of a portion of the wind turbine with the cable drip loop securement system that includes a plate system as shown in FIG. 9 according to embodiments herein.

FIGS. 8, 9 and 10 show displaceable cable loop drip securement device in form of plate system 43 with positioning element 51 according to embodiments described herein. Usually, the positioning element 51 is welded to tower wall 13 of a wind turbine tower. However, positioning element 51 may also be removably attached to tower wall 13. FIG. 8 shows an upper portion of a wind turbine tower 12 including part of nacelle 16 with yaw bearings 39 that enables the nacelle to rotate or pivot during operation around yaw axis 38 with respect to the fixed position of tower 12. At least one cable 17 or cable bundle 19 is routed from the nacelle to tower 12 via nacelle cable fixing 23.

Plate system 43 is usually installed inside tower 12 and generally connected to positioning element 51 by at least one adjustable bar 54 that may include, for example, pin joints 47. Positioning element 51 is usually fixed to the inside of tower wall 13 but may also be positioned anywhere else within tower 12.

The position of plate system 43 along the at least one cable 17 or cable bundle 19 may be changed to increase/decrease the available space between nacelle cable fixing 23 and plate system 43, which is used for cable knurl formation. Once the space for cable knurl formation has been adjusted, the at least one cable 17 or cable bundle 19 may be attached or affixed to plate system 43 via one or more fixing elements 49.

During operation of a wind turbine, nacelle 16 may rotate around yaw axis 38 and cause the at least one cable 17 or cable bundle 19 to twist and form a cable knurl 37 above plate system 43, as is shown in FIG. 9. During the formation of cable knurl 37, plate system 43 may be displaced in an upward direction inside of tower 12. One or more adjustable bars 45 enable and guide upward moving plate system 43.

With respect to the degree of twisting, the section of the at least one cable 17 or cable bundle 19 below plate system 43 remains unaffected by the formation of knurl 37, hence, remains untwisted. Generally, this is achieved by a section of at least one cable 17 or cable bundle 19 being fixed to plate system 43 via one or more fixing elements 49, which ensure that no twisting or rotational forces of the section of the at least one cable 17 or cable bundle 19 above plate system 43 is transmitted to the section of at least one cable 17 or cable bundle 19 below plate system 43.

Further, according to embodiments, FIGS. 8 and 9 show supervision system 29 that may be installed inside of tower 12. Generally, a supervision system, for example, a twist switch monitors twisting or untwisting of at least one cable inside a wind turbine tower in real time and may initiate a stop sequence of the wind turbine via a processor or central control system when it detects a cable jam, other uncontrolled movement of the at least one cable or when a maximum number of twists by the one at least one cable is reached. FIGS. 8 and 9 show supervision system 29 connected with one part to nacelle cable fixing 23 and with another part to plate system 43.

According to embodiments, an untwisting mechanism including, for example, a weight may be present at the bottom of plate system 43 to facilitate untwisting of cable knurl 37 during backward rotation of nacelle 16 (not shown in the Figs.).

FIG. 10 shows a cross-section (C-C) of FIG. 9 including plate system 43, which is mounted to the inner tower wall 13 via positioning element 51. Adjustable bars 45 with pin joints 47, are connecting positioning element 51 and plate system 43. Part of the at least one cable 17 or cable bundle 19 may be fixed to a first plate 55 via one or more fixing elements 49. A second plate 57 may be connected to the first plate 55 via one or more side bars 53. In general, the plate system may include one, two, three or more plates to which part of at least one cable or cable bundle is attached. Further, usually part of the at least one cable or cable bundle may be attached to either side of the plates: facing the tower wall or the centre of the tower or both.

FIG. 11 is a flow chart of a method for adjusting or controlling the area of knurl formations of at least one cable that is routed from the nacelle to the tower during operation of a wind turbine. Usually, the at least one cable is routed from the nacelle into the tower. The cable drip loop securement system is generally connected to the inside of the tower. In block 910, the position of the displaceable cable drip loop securement device is adjusted along the at least one cable. Typically, the position of the displaceable cable loop securement device along the at least one cable is chosen such that enough space is provided between the nacelle and the displaceable cable loop securement device for the formation of cable knurls during operation of the wind turbine. Finally, in block 20 at least one is chosen from affixing part of said at least one cable to said displaceable cable drip loop securement device or providing a stop mechanism that limits the downward range of motion of said displaceable cable drip loop securement device.

The above-described systems and methods facilitate controlling the area of knurl formation of at least one cable or cable bundle. More specifically, controlling the twisting of cables, which are routed from the nacelle into the tower of a wind turbine, prevents system malfunctions, overheating in the knurls and movement of the knurls to other parts in the tower. Additionally, system safety may be increased and excessive wear of the at least one cable or cable bundle as well as wear on surrounding structures, such as, for example, ladders or lights may be reduced.

Exemplary embodiments of systems and methods for a cable drip loop securement system that during operation of a wind turbine, including a nacelle supported by a tower prevents knurl formations beyond a specified area of at least one cable that is routed from the nacelle into the tower are described above in detail. The systems and methods are not limited to the specific embodiments described herein, but rather, components of the systems and/or steps of the methods may be utilized independently and separately from other components and/or steps described herein. For example, the cable drip loop securement system may be employed in other wind turbines, for example vertical wind turbines, other power generating machines or devices where at least one cable is routed from one section to another, whereby the one section moves in opposing directions to the other, and are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cable drip loop securement system for use in a wind turbine, the wind turbine comprising a nacelle supported by a tower and at least one cable that is routed from the nacelle to the tower, the cable drip loop securement system comprising:
- a displaceable cable drip loop securement device for accommodating part of the at least one cable; and
- a positioning element for connecting said displaceable cable drip loop securement device to the tower,
- wherein said cable drip loop securement system is configured to prevent formation of knurls by the at least one cable below said displaceable cable drip loop securement device, and
- wherein the displaceable cable drip loop securement device comprises:
  - a plate system comprising a plate configured to accommodate part of the at least one cable, or
  - a disc having at least one through-hole configured to accommodate part of the at least one cable.

2. The cable drip loop securement system according to claim 1, further comprising a supervision system, which monitors at least one of twisting and untwisting of the at least one cable.

3. The cable drip loop securement system according to claim 2, wherein the supervision system comprises at least one element chosen from a twist switch and a limit pull cord switch.

4. The cable drip loop securement system according to claim 1, further comprising a cable untwisting mechanism.

5. The cable drip loop securement system according to claim 1, further comprising a fixing element configured to fix part of the at least one cable that is passed through said at least one through-hole such that the at least one cable can turn only above said disc.

6. The cable drip loop securement system according to claim 1, wherein said displaceable cable drip loop securement device is configured to be connected to a guiding rail system.

7. The cable drip loop securement system according to claim 6, wherein said guiding rail system comprises at least three guide rails.

8. The cable drip loop securement system according to claim 6, wherein said displaceable cable drip loop securement device further comprises a multi-roller system at the contact points with said guiding rail system.

9. The cable drip loop securement system according to claim 1, wherein said displaceable cable drip loop securement device is configured to be connected to a pipe.

10. The cable drip loop securement system according to claim 9, wherein said displaceable cable drip loop securement device further comprises a multi-roller system at the contact points with the pipe.

11. The cable drip loop securement system according to claim 1, wherein said plate system further comprises one or more adjustable bars that connect said plate system to said positioning element.

12. A wind turbine comprising:
- a nacelle supported by a tower;
- at least one rotor blade to capture wind energy;
- at least one cable routed from said nacelle to said tower; and
- a cable drip loop securement system, comprising:
  - a displaceable cable drip loop securement device for accommodating part of said at least one cable; and
  - a positioning element for connecting said displaceable cable drip loop securement device to said tower,
- wherein said cable drip loop securement system is confieured to allow formation of knurls by said at least one cable only above said displaceable cable drip loop securement device, and
- wherein the displaceable cable drip loop securement device comprises:
  - a plate system comprising a plate configured to accommodate part of the at least one cable, or
  - a disc having at least one through-hole configured to accommodate part of the at least one cable.

13. The wind turbine according to claim 12, further comprising at least one supervision system, which monitors at least one element chosen from twisting, untwisting of said at least one cable and a cable reservoir of said at least one cable below said displaceable cable drip loop securement device.

14. The wind turbine according to claim 12, wherein said displaceable cable drip loop securement device is configured to be connected to a guiding rail system or a pipe.

15. A method for controlling formation of cable knurls in a wind turbine, the wind turbine comprising:
- a nacelle supported by a tower;
- at least one cable routed from said nacelle to said tower; and
- a cable drip loop securement system including a displaceable cable drip loop securement device and a positioning element,
- wherein the displaceable cable drip loop securement device comprises:
  - a plate system comprising a plate configured to accommodate part of the at least one cable, or
  - a disc having at least one through-hole configured to accommodate part of the at least one cable,
- wherein said method comprises:
  - adjusting a position of said displaceable cable drip loop securement device along said at least one cable; and
  - at least one chosen from affixing part of said at least one cable to said displaceable cable drip loop securement device and providing a stop mechanism that prevents further downward movement beyond said position of said displaceable cable drip loop securement device.

* * * * *